July 16, 1957

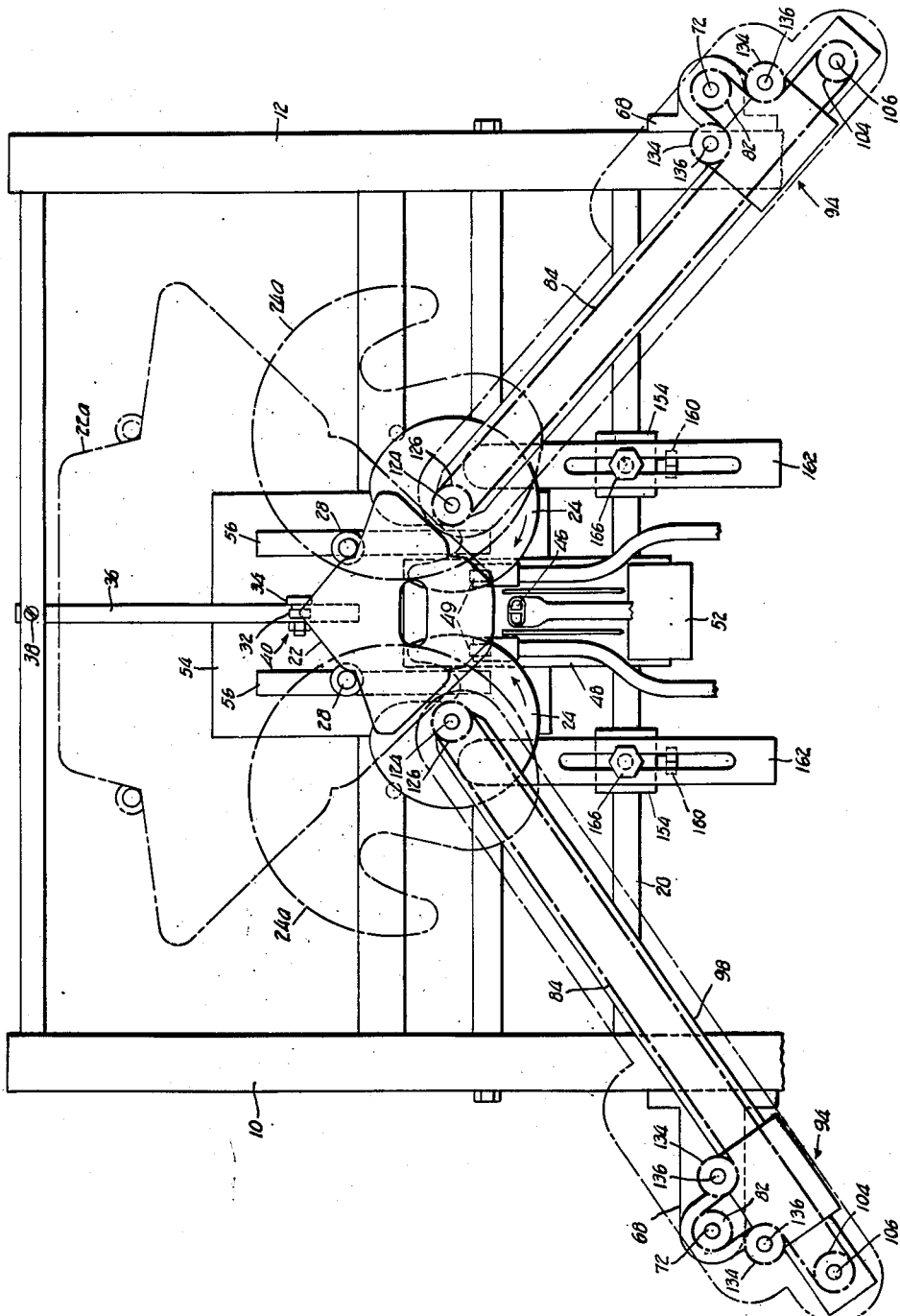

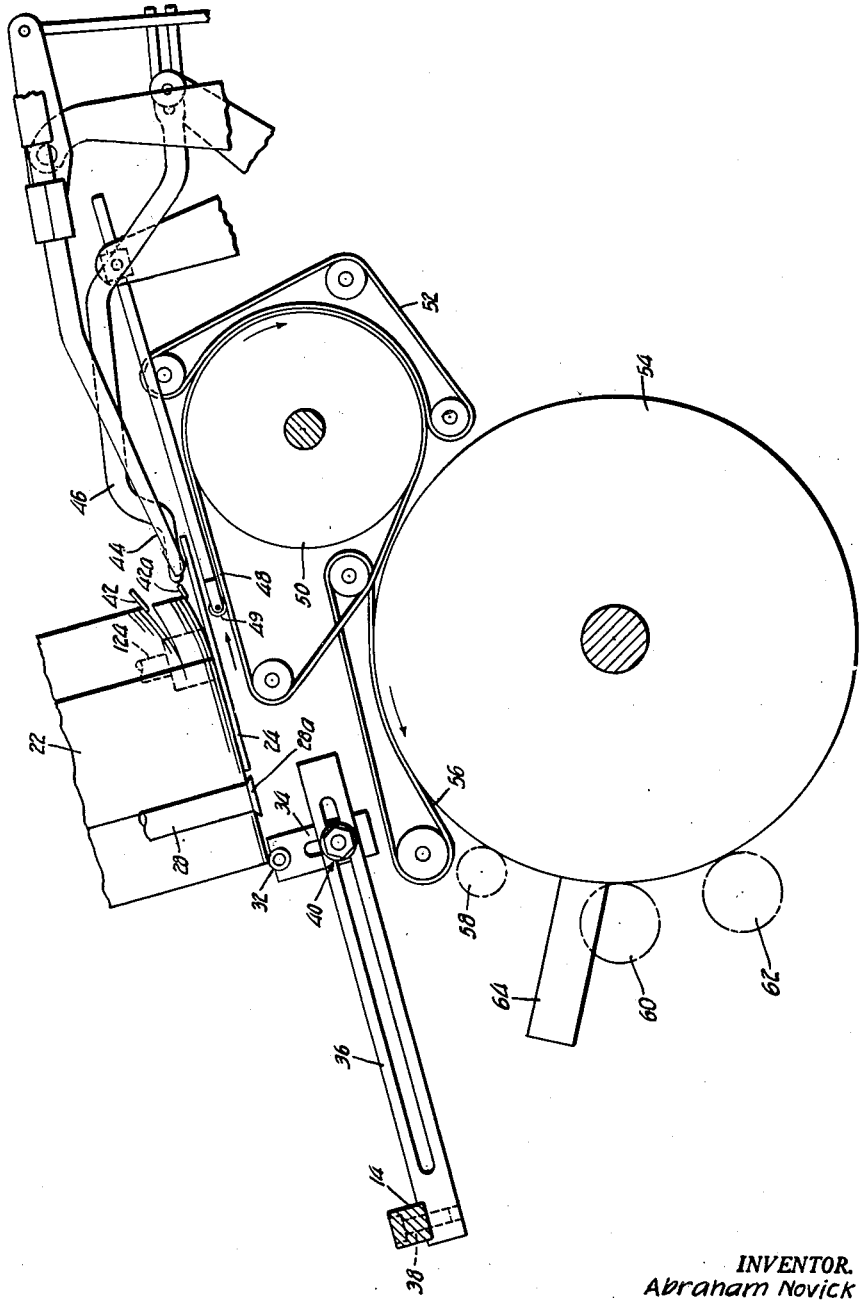

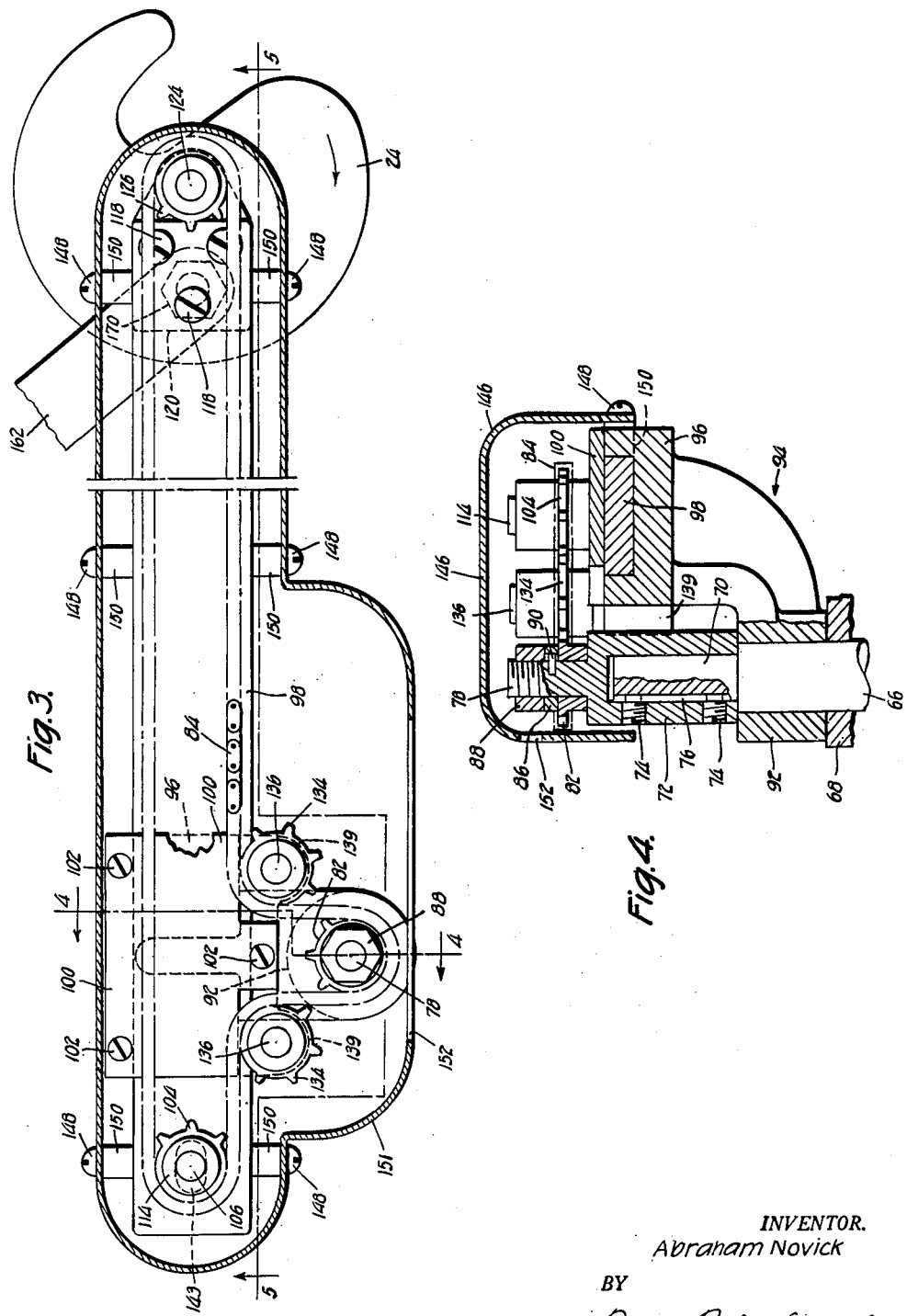

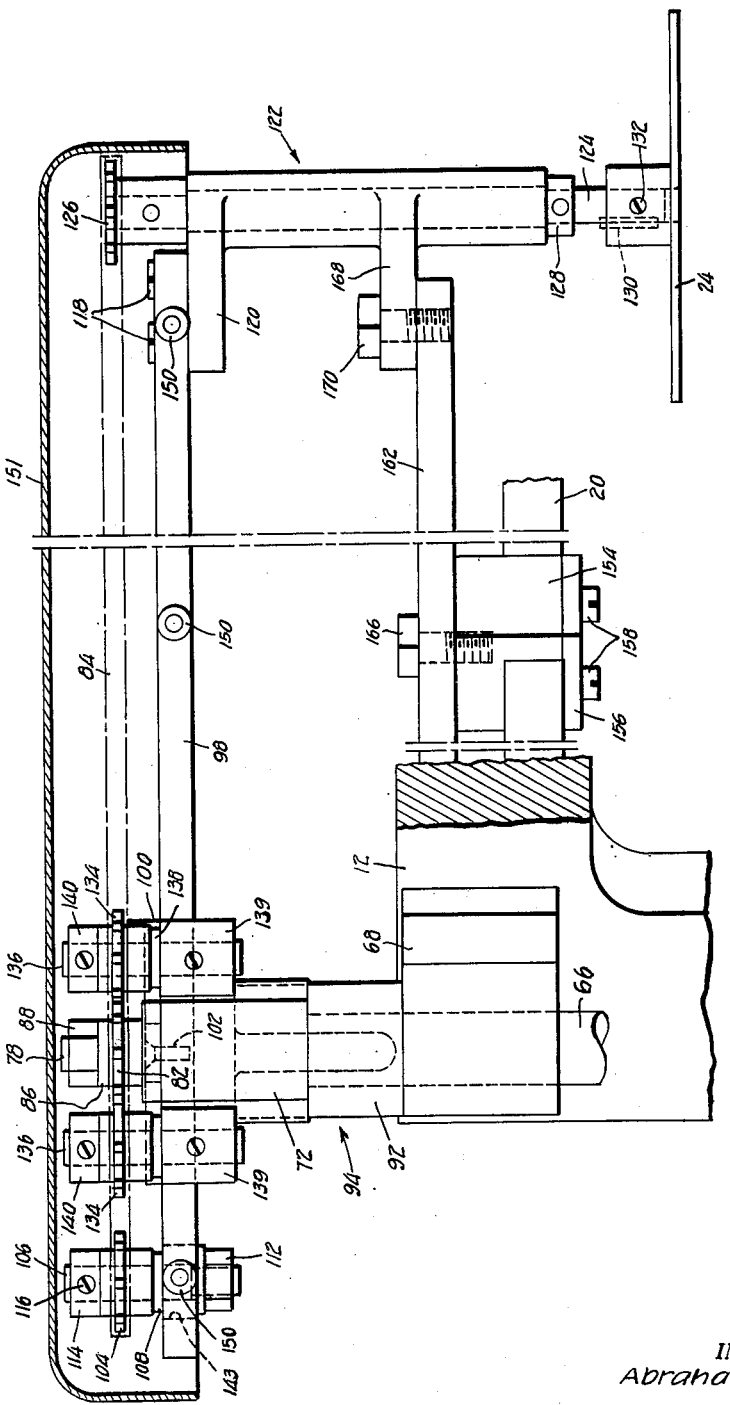

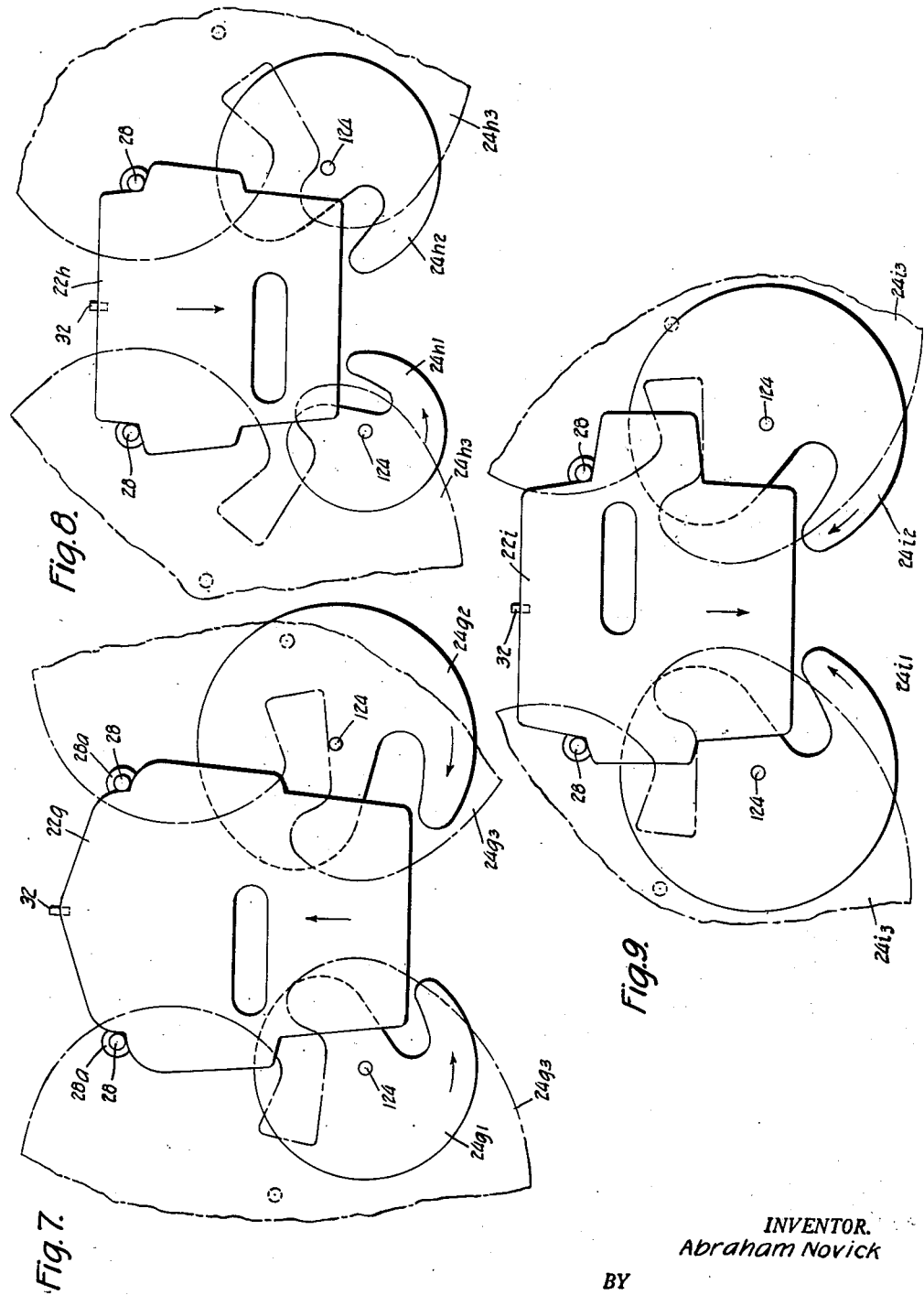

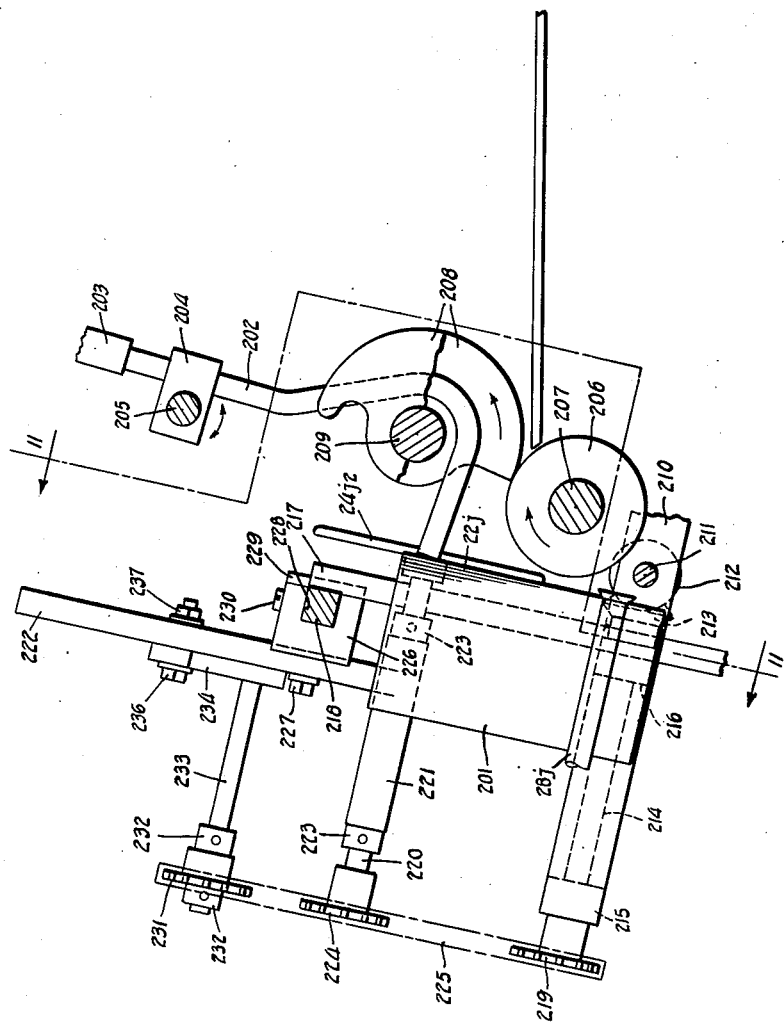

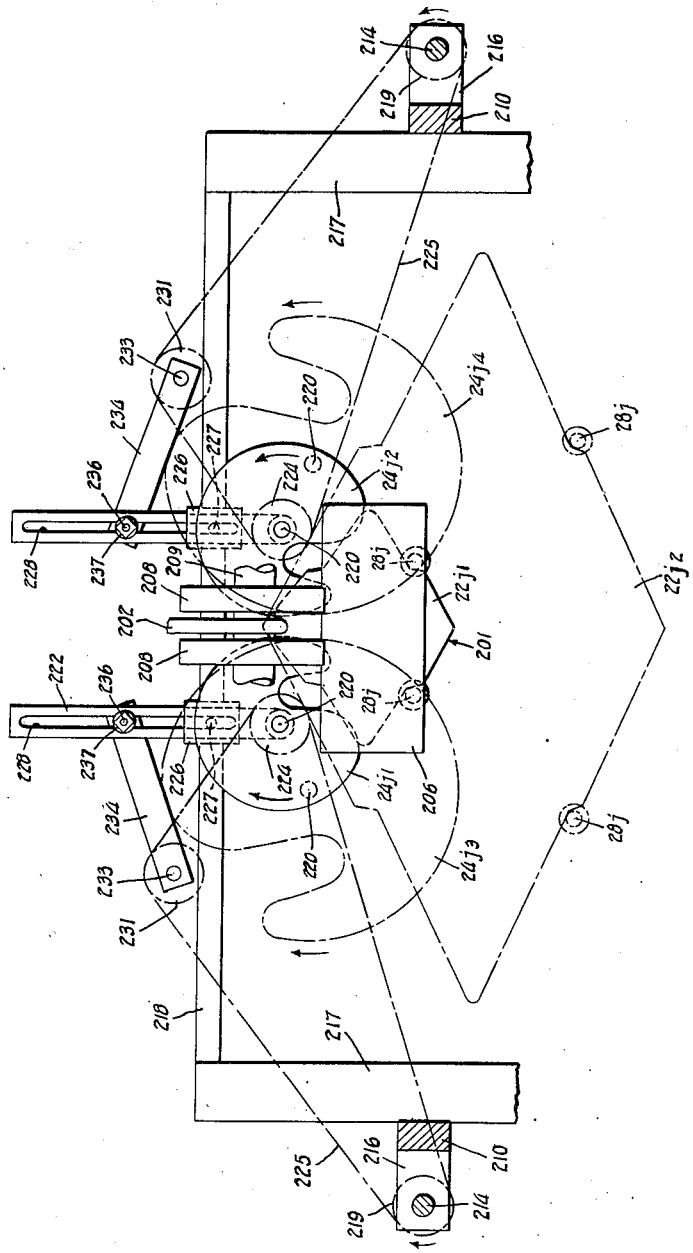

A. NOVICK 2,799,497

BLANK FEEDING MECHANISM

Filed Jan. 18, 1954

INVENTOR.
Abraham Novick

BY

ATTORNEYS

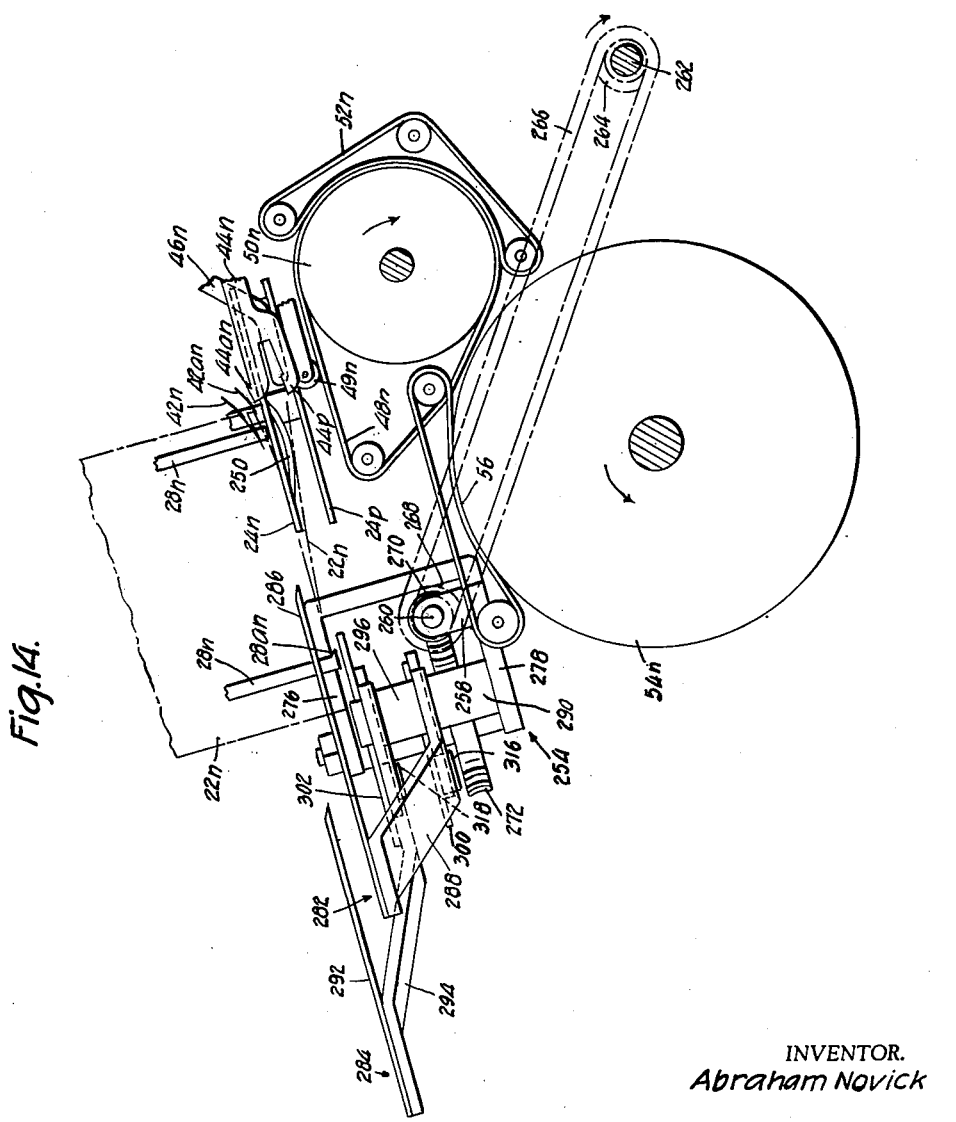

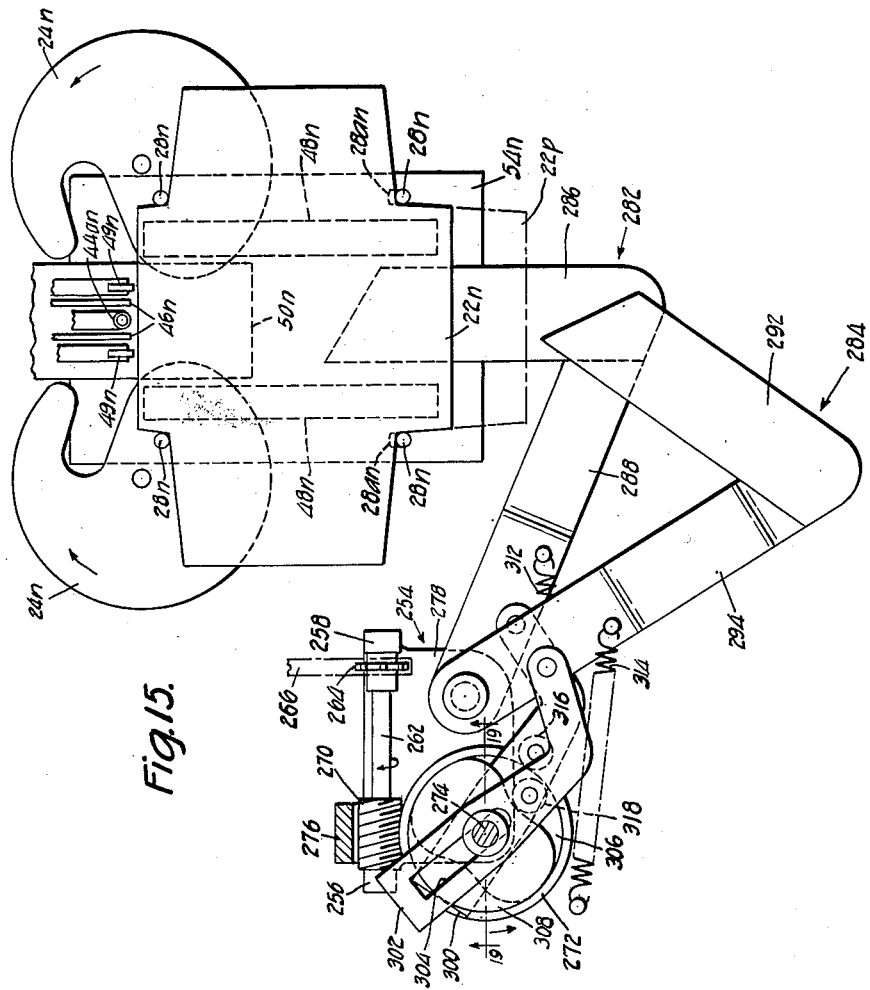

July 16, 1957  A. NOVICK  2,799,497
BLANK FEEDING MECHANISM
Filed Jan. 18, 1954  13 Sheets-Sheet 13
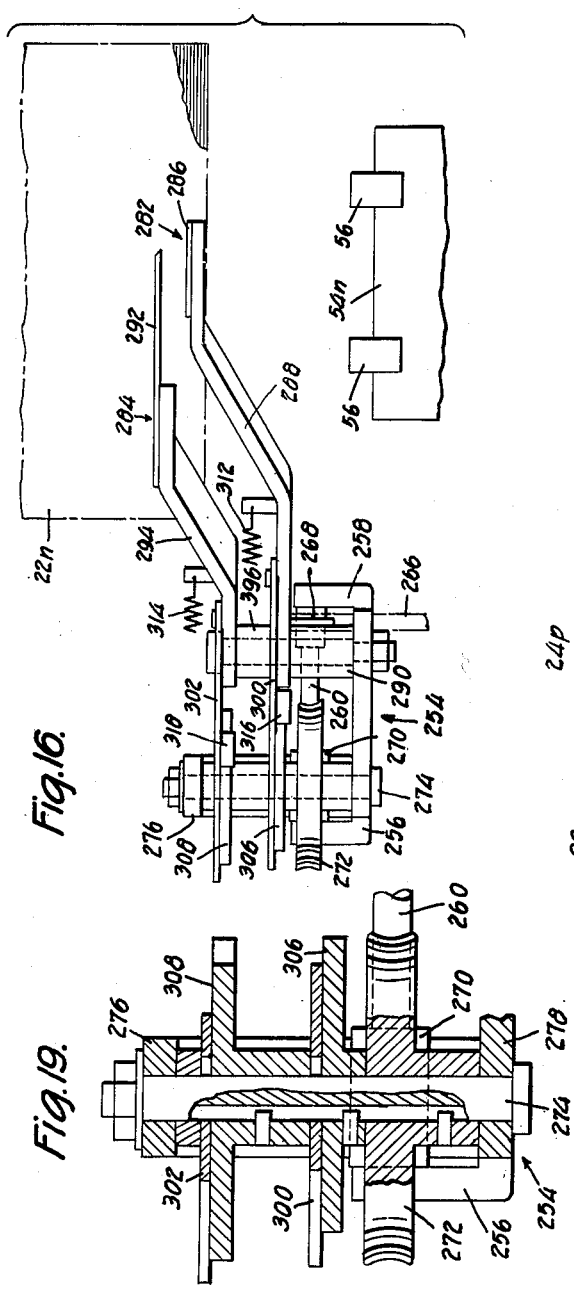
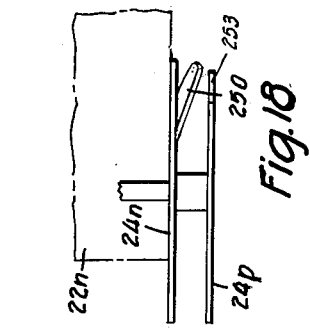
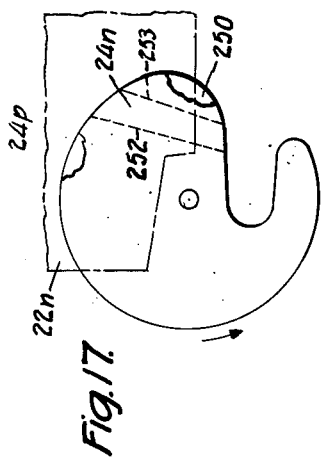
INVENTOR.
Abraham Novick
BY Moser, Nolte, Crust Berry
ATTORNEYS

United States Patent Office 2,799,497
Patented July 16, 1957

2,799,497
BLANK FEEDING MECHANISM

Abraham Novick, Flushing, N. Y., assignor to F. L. Smithe Machine Co., Inc., New York, N. Y., a corporation of New York Application January 18, 1954, Serial No. 404,619

27 Claims. (Cl. 271—2)

This invention relates to improvements in blank feeding mechanism for envelope machines of the type in which separator discs are employed in supporting a blank stack and in separating the blanks from the stack one by one.

The invention is in the nature of an improvement upon the blank feeding mechanisms disclosed in United States Patents No. 1,808,706 and 2,142,143. In the mechanism of the former patent, for example, a stack of envelope blanks is placed in a magazine to rest upon rotary separator discs, and other separating mechanism acts in time with the discs to cause an edge portion of the lowermost blank to be bent down away from the stack for separation by disc fingers each time the fingers come around into separating position. Means are also provided for feeding each separated blank a short distance to detach it from the stack and to cause the separated blanks to be arranged directly into fanned out relation. All of the above features may advantageously be utilized in mechanism embodying the present invention. The invention is, however, applicable to pull-out feeders as well as fan-out feeders.

It is common practice to provide separator discs of equal size, large or small, and to mount them with provision for lateral adjustment so that they may act upon stacks of envelopes of different sizes. Since the separator tips must act in the deflected area, close to the longitudinal center line of the blank, the fact that the discs are restricted to lateral adjustment imposes rigid requirements as to disc size, compelling large discs to be utilized.

It is desirable for a number of reasons to use for each size and type of envelope blank the smallest discs capable of adequately supporting the stack.

One advantage in using small discs is that friction between the discs and stack is reduced. The amount of friction exerted is a function of the disc area in contact with the stack and of the velocity of the disc surface in engagement with the blank. The area of a disc is proportional to the square of the radius, while the velocity of each part of the disc is proportional to the radius of that part. Reducing the radius of the disc, therefore, not only reduces the area in contact with the stack, but removes the very portion of that area which would travel most rapidly.

Friction has a tendency to propel the bottom of the stack in a direction away from the blank deflecting sucker, and hence to displace the edge of the stack away from the position at which proper sucker action is obtained. Even a slight disturbance of the position of the front edge of the stack upsets the proper separator action, because of the fact that the sucker is designed to extend only a very slight distance under the stack. The sucker, for proper action, must engage the bottom sheet as close to the edge as possible. If, therefore, the disc friction causes the stack to be moved even slightly, the suction opening of the sucker is partially uncovered and causes the sucker to fail.

Lowering the friction of the discs results in a reduction of the driving effort required. This is very desirable because the high power requirement frequently encountered in prior machines has been found to have a destructive effect upon the driving mechanism. The large discs act as heavy flywheels, opposing the starting and stopping of the machine. This has a damaging effect upon the drive gearing and a disturbing effect upon delicate adjustments throughout the machine.

With the object of overcoming the foregoing difficulties, it is a primary purpose of the invention to provide universal adjustment for the discs and their driving mechanism, that is to say, either longitudinal or lateral adjustment, or adjustment which combines longitudinal and lateral components in any desired proportion.

Universal adjustment has the advantage that the discs can be placed in the most favorable positions with reference to the particular type of blank being acted upon, to give adequate support with a minimum of friction. Only universal adjustment of the disc centers permits the discs to be properly located to make it possible in each case (a) for the disc points to enter over the deflected sheet and under the stack at a point close to the sucker where the deflection or gap between the deflected sheet and the stack is greatest; (b) for the peripheries of the discs to be far enough from the usual ledges which support the rear corners of the blanks, to allow the discs to slice through between the stack and the lowermost blank without buckling or tearing the blank against the ledge; (c) for the total area engaged and supported by the disc to be of the least practicable extent, but sufficient to prevent the stack from sagging; and (d) for the size of the disc to be small enough to keep the peripheral speed at a minimum.

In the case of envelope blanks having window openings formed in them, there are additional factors which present difficulty. The blanks are weakened by the formation of the window openings, are therefore less self-supporting, and require extra support from the discs. The windows, if crossed by the disc separating points, will be snagged and mutilated. This presents a difficulty under the former arrangement which is aggravated by the fact that the window openings are provided in various parts of envelope bodies, seldom being symmetrically disposed.

The present invention provides the additional advantage in connection with this situation that the axis of one disc may be located in advance of the other, with the two disc axes located at the same or different distances from the longitudinal center line of the stack as desired. This is particularly advantageous because two discs of different sizes may be employed at the same time. Thus, discs may be chosen which adequately support the stack and avoid danger of snagging the blank in the window openings, but with a much reduced area of stack engagement and a much reduced peripheral speed of one or both discs as compared with the previously available arrangements.

Because of the use of comparatively large discs under prior practice which tended to displace the stack away from the sucker, it was necessary to provide supporting rollers which reduced the disc friction by partially taking the weight of the stack off the discs. These rollers, however, introduced resistance to withdrawing of the bottom blank, which resulted in inaccurate feeding or spacing of the withdrawn blanks, and thereby introduced difficulties in the operations of the machine. Under the present invention, there is no need to provide supporting rollers under the body of the stack. Support may be confined to the extreme edges or margins, where it will sustain the edges but will not interfere with the withdrawal of a blank, nor with the free fall of the blank as soon as feeding begins.

The free fall of the blank is generally desirable for the reason pointed out above, but it is especially advantageous for another reason when dealing with window envelope blanks. Under the former practice, separating appurtenances called shovels had to be provided to prevent the window opening of the blank being withdrawn from hooking onto the window opening of the last blank left in the stack. This difficulty is completely obviated by permitting the separated blank to fall freely. The shovels limited the speed of the machine and their elimination has led to increased output.

It is a salient feature that novel disc driving mechanism is provided for enabling the discs to be adjusted as described, in a quick and convenient manner, while maintaining the operativeness of the drive.

In accordance with one form of embodiment of the invention it is a feature that provision is made of shovels which are thrust into the rear of the stack in alternation and at different levels to take the load of the stack at the rear off the lower blanks of the stack. This reduces the friction between adjoining blanks, and between the blanks on the one hand and the stack supporting means on the other. The lower shovel is desirably disposed to act at a level a dozen or so blank thicknesses up from the bottom of the stack, while the upper shovel is desirably disposed to act about three dozen blank thicknesses up from the bottom of the stack. These figures are illustrative however, and are subject to considerable variation as will be pointed out. The shovels are comparatively slow acting, each being designed when inserted to remain inserted while a multiplicity of blanks is separated from the stack, but never long enough to exhaust the supply of available blanks below the level of the lower shovel.

It is still a further feature, according to one form of embodiment, that duplex separator discs are provided on the disc shafts, the first or upper discs serving to separate the forward portion of a blank from the stack during one revolution of the disc shafts and the second or lower discs cooperating with pressing members to separate the blank still further from the stack and to deliver it into engagement with a feeding conveyor during a second revolution of the disc shaft.

Other objects and advantages will hereinafter appear.

The present application is a continuation-in-part of my application for Letters Patent of the United States, Serial No. 275,053, filed March 6, 1952, for Blank Feeding Mechanism, now abandoned.

In the drawing forming part of this specification.

Figure 1 is a comprehensive plan view of a portion of an illustrative fan-out feeder in which improvements of the present invention are embodied, the parts being shown set up for dealing with a stack of comparatively small blanks, but a stack of much larger blanks, and much larger discs being indicated in dot and dash lines as they would be set up in the same machine;

Figure 2 is a fragmentary view in sectional, side elevation of a portion of the mechanism shown in Figure 1;

Figure 3 is a plan view of one of the discs together with its associated drive unit, the mechanism being broken away intermediate its ends for compactness of illustration, and a fragment of the adjusting means being also shown;

Figure 4 is a sectional view taken upon the line 4—4 of Figure 3, looking in the direction of the arrows;

Figure 5 is a fragmentary view in sectional elevation of one of the discs with its supporting, driving, and adjusting means, the section being taken upon the line 5—5 of Figure 3, looking in the direction of the arrows;

Figures 7, 8 and 9 are plan views showing different forms of wallet-type window envelope blanks with the separator discs used in connection with these blanks under the present invention shown in full lines, and with fragments of the much larger discs used with the same blanks under prior practice indicated in dot and dash lines;

Figure 10 is a view in sectional side elevation of a pull-out feeder in which another form of disc driving, supporting and adjusting mechanism is embodied;

Figure 11 is a fragmentary vertical sectional view of the mechanism of Figure 10 taken upon the line 11—11 of Figure 10, looking in the direction of the arrows;

Figure 14 is a fragmentary view in side elevation of a modified form of feeder in which stack supporting shovels and duplex discs are employed;

Figure 15 is a fragmentary plan view, partly broken away, of the mechanism shown in Figure 14;

Figure 16 is a fragmentary view in end elevation showing a portion of the mechanism of Figures 14 and 15;

Figure 17 is a plan view showing one of the upper separator discs at an advanced stage in the operating cycle;

Figure 18 is a side view of the structure of Figure 17 at the same point in the cycle; and Figure 19 is a vertical section taken on the line 19—19 of Fig. 15 looking in the direction of the arrows on said line.

Figure 6:
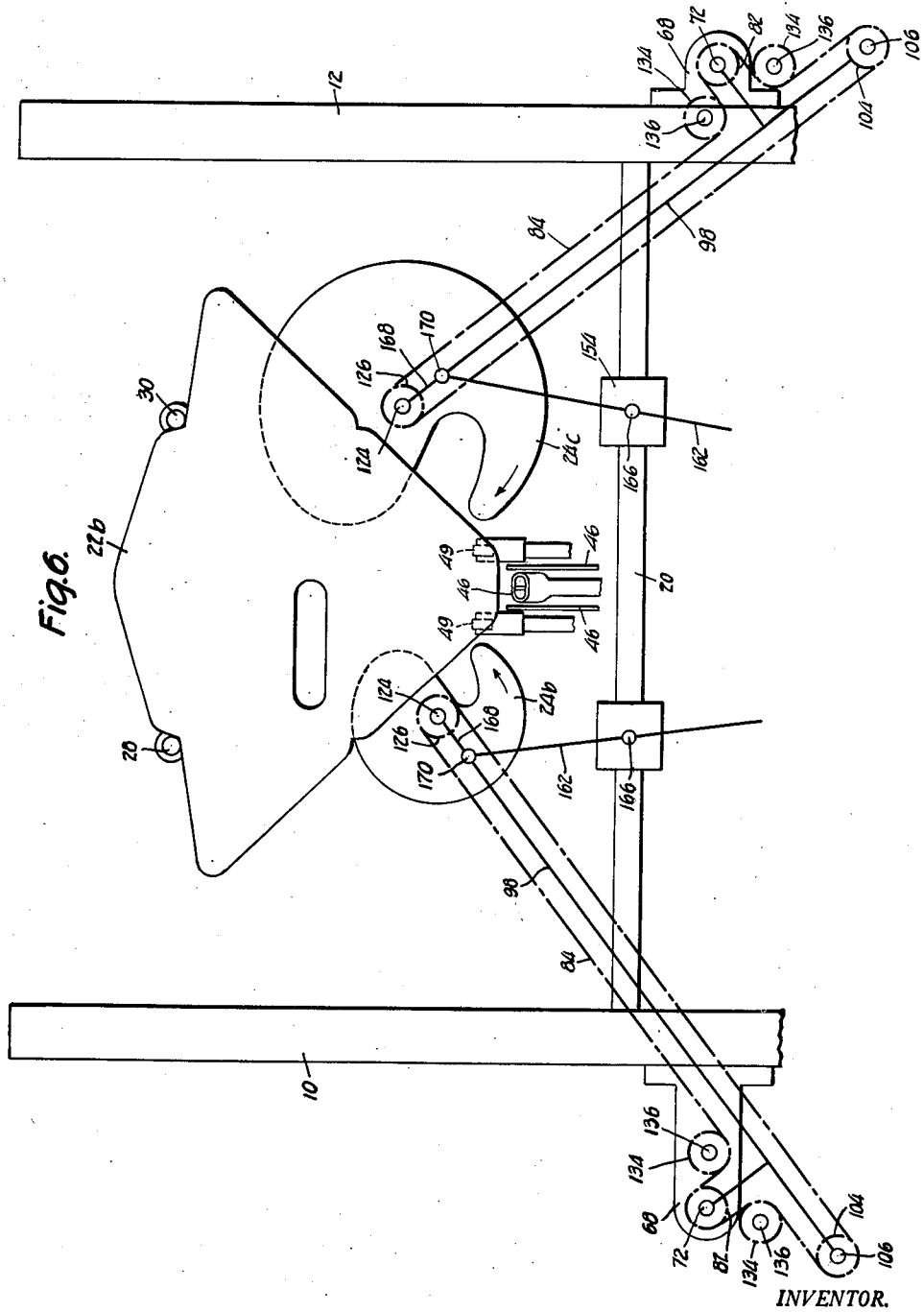
Figure 6 is a plan view similar to Figure 1 but showing discs of different sizes employed in connection with a stack of comparatively large window blanks.

The illustrative machine of Figs. 1 to 9 comprises upright side frame members 10 and 12 which are connected to one another by cross bars 14, 18 and 20, the cross bars being supported by the frame members. A stack 22 of envelope blanks rests upon a pair of separating discs 24, the discs being supported from the frame members 10, 12 by mechanism which will be described at a subsequent point. Part of the weight of the stack is, however, borne by depending members 28, 30, supported from above by means not shown, together with a roller 32. The roller 32 is rotatively mounted in a bracket 34 and the bracket, in turn, is adjustable along a rod or bar 36 disposed beneath and intermediate the discs. The rod 36 is affixed at one end to the center of the cross bar 14 by any suitable means such as screws 38. The bracket 34 and the bar 36 are both flat, slotted members, and are held together by a screw and nut combination 40.

At its forward end the stack is supported by means of upper and lower fingers 42 and 42a, the fingers acting to sustain the forward edges of the blanks in a somewhat elevated position.

The feeding of the lowermost blank is initiated by the action of a sucker 44 which has a compound motion to and fro as well as up and down. When the sucker 44 is moved into engagement with the lowermost blank and then moved downward it pulls the edge of the lowermost blank downward past the finger 42. The suction is then cut off and the blank is engaged by a pair of pressure or transfer members 46 which move the leading end of the blank against a conveyor 48. Traction of the blank against the conveyor carried series of blanks is then effected by means of a pair of rollers 49 which move lengthwise of the conveyor 48 across the end of the blank and press it toward the conveyor. The mechanism for actuating the members 44, 46 and 48, is well understood, and forms no part of the present invention. For a more complete understanding of such mechanism, reference may be had to Patent No. 1,808,706.

The conveyor 48 is a slow-running conveyor which travels only a distance equal to the width of a sealing gum strip for each separating cycle, so that the blanks are arranged on the conveyor directly into over-lapped or fanned-out relation, ready for feeding past a fan-out gummer. The fanned out pack is carried forward by the conveyor 48 around a cylinder 50, being held to the conveyor and the cylinder by a pair of opposed friction belts 52. From the cylinder 50 the blanks are delivered onto a drum 54 to which they are held by belts 56 and feed rollers 58, 60, 62. The drum carries the blanks past a gumming element 64 by which the sealing margins of the blanks are gummed. From the drum 54 the blanks pass to a drier, not shown, and are thence delivered to operating instrumentalities for completing their manufacture into finished envelopes.

The novel mechanisms for supporting, driving and adjusting the respective separating discs are illustrated in Figures 1 and 3 to 6. These mechanisms are duplicates of one another so that a description of one of them will suffice for both.

A driven vertical shaft 66 extends upward along the outer side of the frame member 10, being rotatively supported and guided in a stationary bearing bracket 68 which is attached to the frame member 10. The shaft 66 has a reduced upper end portion 70. A cap extension 72 surrounds the end portion 70 of the shaft and is made fast upon it by means of screws 74 which are threaded through the wall of the extension 72 and into binding engagement with the base of a channel or keyway 76 which is formed in the end portion 70 of the shaft. The extension 72 has a reduced upper end 78 and is formed with an upwardly facing shoulder 80 at the level where such reduced end portion begins. A sprocket 82 is secured upon the reduced end 78 against the shoulder 80, for driving a chain 84. A washer 86 bears against the upper face of the sprocket 82, being clamped against the sprocket forcibly by a nut 88 which is threaded on the upper end of the reduced portion 78. A pin 90 projects laterally from the reduced end 78 and is received in a notch of the washer 86, positively to compel the washer to turn in unison with the shaft extension 72.

The shaft extension 72 is of larger diameter at its lower end than the shaft 66 and therefor extends outward beyond the circumference of the shaft 66. In cooperation with the bracket 68 it serves to confine an ear 92 of a bracket 94 against movement axially of the shaft 66 while leaving the bracket free to turn upon the shaft. A disc driving and supporting unit of which the chain 84 forms a part is carried by the bracket 94. The entire unit may be turned with the bracket about the axis of the shaft 66. The unit may also be adjusted lengthwise relative to the bracket. The bracket includes a channel supporting block 96 in which a bar 98 is guided for longitudinal movement. A keeper plate 100, secured to the block 96 by screws 102, confines the bar 98 in the channel.

The bar 98 supports at its outer end an end sprocket 104 upon which the chain 84 runs. A bearing pin 106, having a flange or collar 108 intermediate its ends, has its lower threaded end passed downward through the bar 98 and clamped to the bar by a washer 110 and a nut 112. The hub of the sprocket 104 is rotatively received upon the upper end of the pin 106, being confined against axial movement between the collar 108 and an upper collar 114. The collar 114, as shown, is secured to the pin 106 by a set screw 116.

At the opposite end of the bar 98 from the sprocket 104 the bar is rigidly secured by screws 118 to an arm 120 of a sleeve 122. A vertical shaft 124 extends through the sleeve 122. A sprocket 126, which has its hub pinned to the upper end of the shaft 122, serves as a second end sprocket for the chain 104. A collar 128, pinned to the shaft 124 immediately below the sleeve 122, bears upwardly against the sleeve and, in cooperation with the hub of the sprocket 126, prevents movement of the shaft axially of the sleeve. The disc 24 is removably secured upon the lower end of the shaft 124, being compelled to turn with the shaft by a key 130 and retained on the shaft by a set screw 132.

The bracket block 96 supports a pair of guide sprockets 134 which are alike in construction. Each sprocket is rotatively carried on the upper end of a bearing pin 136.

The pin includes a flange or collar 138 which rests upon a lug 139 of the bracket block 96. The sprocket hub is confined between the collar 138 and an upper collar 140, the latter collar being secured on the pin 136 by a set screw 142. The lower end of the pin extends into the lug 139 and is fixed in place by a set screw 144. A slot 143 in the bar 98 and through which the lower end of the pin passes permits adjustment of the pin lengthwise of the bar 98 to take up slack in the chain 84.

It will be observed that the bar 98, together with the sleeve arm 120, serves rigidly to space the sprockets 104 and 126, maintaining them always at a fixed distance from one another after adjustment of the sprocket 104 to take up the chain slack. The sprockets 104 and 126 may be adjusted in unison with one another and with the bar 98. The sprockets 134 are located to maintain the chain reach engaged by them in parallelism with the chain reach which they do not engage. As best seen in Figure 3, the chain 84 is trained around the end sprockets 104 and 126, engages the inner faces of the sprockets 134 and passes laterally between the sprockets 134 to extend around the sprockets 82. When the bar 98 is slid endwise, the sprockets 104 and 126 move in unison. The sprockets 82 and 134, however, remain bodily fixed. The required chain length is not affected by this adjustment. When the bracket 94 is swung about the shaft 66, the required chain length remains unchanged.

A protective cover 146 is provided for the drive unit, being supported from the bar 98 by projecting screws 148 which are threaded into studs 150 on bar 98. The cover includes a side extension 151 for receiving the fixed sprockets 82 and 134, and since the cover 146 participates in the adjusting movement of the bar 98, the side extension is made long enough to permit the relative adjustment without interference.

While adjustment of the bar 98 maintains the operative relation of the parts without tending to change the required chain length, as has been pointed out above, it would produce rotation of the sprockets 104 and 126, and thus produce a disturbance of phase of the separator disc, if provision were not made to avoid that result. It is for that reason that the sprocket 82 is clamped to the shaft extension 72 by means of the nut 88. Either before or after an adjustment, the nut 88 is partially backed off from the reduced end 78 of the shaft extension 72 to permit the sprocket 82 to turn relative to the shaft 66. When the desired adjustment has been made the disc is checked and, if necessary, adjusted as to phase, and the nut 88 is then retightened. A slot 152 is provided in the side extension of the cover 146 to enable the nut 88 to be reached and operated by a wrench from outside the cover.

For the purpose of effecting desired adjustments and of retaining the parts in adjusted positions, an adjustable linkage is provided between the bearing sleeve 122 and the machine frame. A channel block 154 is slidably mounted on the cross bar 20, being held thereto by a keeper plate 156 which is secured to the block by screws 158. The block 154 is normally fixed in position relative to the cross bar 20 by means of a set screw 160. The set screw may be partially backed out, however, when it is desired to adjust the block.

A link 162 is connected to the block 154 with capacity both for angular and pivotal adjustment. The link is formed with a longitudinally extending slot 164 through which the shank of a lag screw 166 is passed. The lag screw is normally threaded as far as possible into the block 154 to cause the screw head to clamp the link in fixed relation to the block. The screw may be partially backed out, however, when an adjustment is to be made. The opposite end of the link is pivotally connected to an arm 168 (Fig. 5), integral with the sleeve 122, by means of a screw 170. It will be readily apparent that the adjusting means described is capable of imparting adjusting movement which combines transverse and longitudinal components in any magnitudes and proportions desired. Since the driving, supporting and adjusting mechanism described is provided independently for each disc, the discs may be independently adjusted to effect any setup required.

In Figure 1 a pair of comparatively small discs 24 are shown acting upon a stack 22 of comparatively small envelope blanks. A comparatively large stack 22a is indicated in dot and dash lines, and comparatively large discs 24a for acting upon the large stack is indicated in dot and dash lines. The capacity for longitudinal as well as transverse adjustment enables comparatively small discs to be employed in such manner that (a) the point of action of the disc points is kept close to the point of sucker action; (b) the stack will be adequately supported without sagging; (c) friction will be held to a minimum so that auxiliary supporting rollers are unnecessary; (d) the disc points avoid snagging of window openings when window blanks are being fed; and (e) conflict of the discs with the supporting rods 23 is avoided, making grooving of the lower faces of the discs unnecessary.

It is an especially important point that the rear end of the blank is released quickly and permitted to fall freely. This avoids the frictional resistance to feeding which occurs when auxiliary stack supporting rollers are provided, and thereby promotes the accurate spacing and alignment of the delivered blanks. When window blanks are involved the free fall of the blank also provides a complete safeguard against the snagging of the window edge of the blank undergoing separation against the window edge of the adjacent, remaining bottom blank of the stack. This enables the feeder to be further simplified by the omission of the shovels, commonly provided in the prior machines for protecting against such window snagging.

If there is no window, or if a window is centrally located, as in the small blank of Figure 1, discs of the same size are employed, and the discs are symmetrically arranged. For other window arrangements discs of different sizes may be employed and the arrangement may be unsymmetrical.

In Figure 6 the mechanism generally is the same as in Figures 1 to 5, and the mechanism has, therefore, simply been diagrammatically indicated with the same reference characters applied as in the previous figures. The blank 22b, however, is shown as a large blank with a window which is located far to one side of the blank. The view illustrates how a small disc 24b and a large disc 24c may be practically combined for dealing with a situation of this kind. The two discs together provide the necessary amount of support. Without universal adjustment this advantageous and efficient arrangement could not be set up and utilized.

Figures 7, 8 and 9 show other examples of unsymmetrical window blanks and the arrangements permitted and utilized in the respective cases to give adequate but minimum support. In Figures 7, 8, and 9 the mechanism is the same as in Figures 1 to 6.

In Figure 7, the window in the blank 22g is to the left of center and is near the bottom fold. The disc 24g1 is accordingly chosen smaller than the disc 24g2. The disc 24g1 is located with its center well in advance of the disc 24g2, and nearer to the center line than the center of the latter disc. Discs 24g3 which would have been used for the same blank in the prior art machine are partially indicated in their proper positions.

In Figure 8, the window in the blank 22h is to the left of center and is formed in the back flap of the envelope blank. This condition is met by employing a small disc 24h2 and a still smaller disc 24h1. The disc centers are located far forward and substantially in lateral alignment with one another. The center of disc 24h1 is located nearer than the center of disc 24h2 to the center line. Discs 24h3 which would have been used for the same service in the prior art machine are partially indicated in their proper positions.

In Figure 9, the window is located far back from the sucker and to the right of center. In this instance equal discs may advantageously be employed notwithstanding the unsymmetrical disposition of the window. The disc 24i1 is, however, located nearer than the disc 24i2 to the center line. The disc centers are in lateral alignment, far in front of the old fixed line of adjustment of the disc centers. The discs are much smaller than the discs which would have had to be employed in the prior art machines. Discs 24i3 which would have been used for the same service in the prior art machine are partially indicated in their proper positions.

In Figures 10 and 11, disclosure is made of a pull-out feeder in which disc supporting and driving mechanism of a modified construction is embodied, this latter construction also making provision for a universal adjustment of the separator discs. The novel supporting, adjusting and driving mechanism of Figures 10 and 11 is equally applicable to the fan-out feeder of Figures 1 to 6, as will be brought out in connection with Figure 13.

As illustrated in Figures 10 and 11, a stack 201 of envelope blanks is supported on inclined rods 23j with the blanks standing on edge as shown in Figure 10. The right hand ends of the rods 23j are enlarged slightly to extend across normal marginal portions of the end blank of the stack. The rods 23j are conventionally supported with capacity for vertical and horizontal adjustment to accommodate stacks composed of blanks of different sizes. Above the rods 23j the stack receives endwise support from a pair of separator discs 24j1 and 25j2.

A sucker tube 202, connected to a suitable source of suction through a flexible hose 203, is supported in a crank 204 fast on a rock shaft 205. The shaft 205 is rocked in time with the action of the separator discs by well known mechanism (not shown). To the right of the separator discs a feed couple is provided consisting of a complete roller 206 fast on a shaft 207 and an opposed pair of roller segments 208 fast on a parallel shaft 209. The shaft 209 is driven in time with the separator discs and the sucker, being caused to make one revolution for each complete cycle of the discs and sucker. The sucker tube 202 extends around the shaft 209 between the segments 208. The sucker creates a gap between the end blank and the remainder of the stack which is entered by the tips of the separator discs. The sucker moves far enough to the right to carry the upper margin of the blank into position to be gripped by the segments 208 and the roller 206, and then returns to act upon the next blank. The blanks are individualized by the feeder, being advanced by the couple 206—208 to subsequent feeding instrumentalities whereby they are carried forward to the mechanisms for converting them into finished envelopes.

The feeder is generally similar to pull-out feeders of the prior art. The novel feeders of the illustrative mechanism have to do with the means for supporting, adjusting and operating the separator discs. Inclined longitudinal frame members 210 support a transverse shaft 211 which is driven at the same rotary speed as shaft 209. The shaft 211, through equal bevel gears 212 and 213, drives two shafts 214 which extend parallel to the frame members 210 and are supported without capacity for bodily movement in lugs 215 and 216 carried by the frame members 210. The shafts 214 are driven at equal speeds but in opposite directions from the shaft 211.

Upstanding frame members 217 have their upper ends connected to one another through a rectangular cross bar 218. Each shaft 214 has fast upon its left hand end a sprocket 219 through which drive is transmitted to one of the separator discs. The drive trains from the sprockets 219 to the discs are duplicates of one another, and hence a single description will suffice for both. The discs themselves and the drive trains referred to are supported from the cross bar 218. The discs are individually capable of universal adjustment, and the drive trains are so contrived that they may be effective to drive the discs in all positions of adjustment.

The separator disc 24j1 is removably secured upon the forward end of a shaft 220, the shaft being mounted in a sleeve 221 which is unitary with an upwardly extending slotted arm 222. Collars 223 affixed to the shaft at opposite ends of the sleeve 221 secure the shaft against axial movement relative to the sleeve. The shaft 220 has fast upon the rear end thereof a sprocket 224, the sprocket being driven from the sprocket 219 through a chain 225.

The arm 222 is supported and guided for lengthwise adjustment in a channel or guideway formed in the rear face of a supporting block 226, being secured in any selected position of adjustment by a headed clamping screw 227 whose shank is passed through the slot 228 of the arm 222 and threaded into the block. Lengthwise adjustment of the arm adjusts the sleeve 221 up or down and therefore correspondingly adjusts the disc 24j1 and the associated drive sprocket 224.

The block 226 is slidingly supported for transverse adjustment along the transversely extending bar 218. The block 226 is formed at its forward side with a horizontal channel 228 in which the bar 218 fits. A cover plate 229 secured to the forward face of the block 226 serves to close the open side of the channel and to maintain the operative relation of the block and bar. The block may be secured in any desired position of adjustment by means of a set screw 230 which is threaded through a portion of the block and which bears against a face of the bar. Adjustment of the block 226 along the bar effects lateral adjustment of the disc 24j1 and of the sprocket 224. It is readily apparent, of course, that the vertical and lateral adjustments can be effected independently of one another or that they can be combined in any desired degrees.

Since the adjustment of the sprocket 224 changes the distance between that sprocket and the fixed sprocket 219, it is necessary to make provision for maintaining the drive connection between them operative under different conditions of adjustment. For this purpose an idler chain tightening sprocket 231 is rotatively mounted between collars 232 on a non-rotary shaft 233. The forward end of the shaft 233 is secured in one end of an arm 234. The arm 234 has its opposite end clamped to the slotted arm 222 between friction washers 235 by means of a headed bolt 236 which is passed through the slot 228, and a nut 237 threaded on the shank of the bolt. When the nut 237 is partially backed off, the arm 234 can be adjusted angularly, or its anchored end can be shifted bodily along the arm 222.

In Figure 11 the smallest size open-side envelope blank upon which the machine is adapted to operate is shown in full lines at 22j1, while the largest size open side blank is shown in dot and dash lines at 22j2. The discs 24j1 and 24j2 are shown in full lines, properly located for acting upon the small blank, while the comparatively large discs 24j3 and 24j4 are shown in dot and dash lines properly positioned for acting upon the large blank. In changing from one setting to the other, the disc centers have been shifted both laterally and vertically. In this machine, as in the fan-out machine, the capacity for universal adjustment makes possible the employment of comparatively small discs, and the combination of different size discs with unsymmetrical window blanks.

Figure 12:
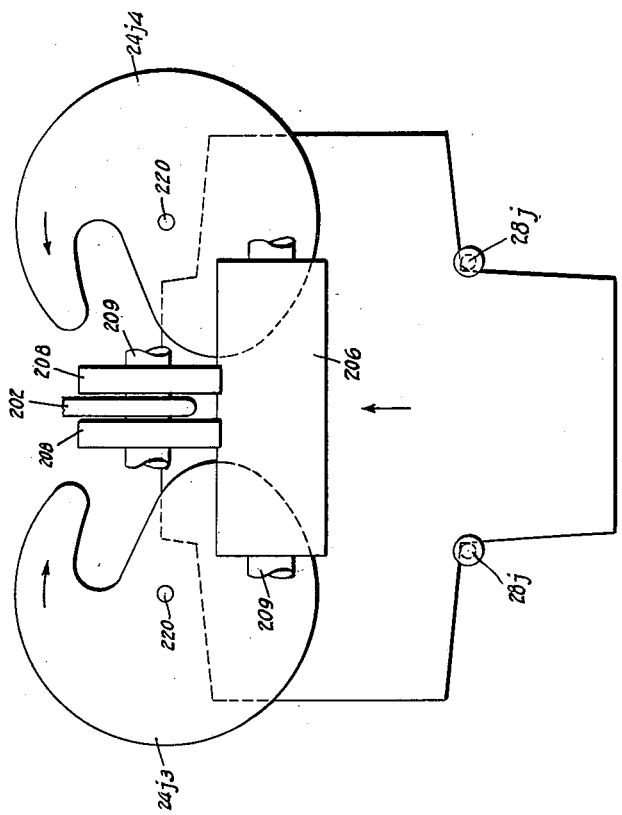
Figure 12 is a fragmentary view like Figure 11 but showing only a portion of the mechanism of Figure 11 in association with an open end envelope.

In Figure 12 the pull-out feeder mechanism of Figures 10 and 11 is shown set up for acting upon an open end envelope blank.

Figure 13:
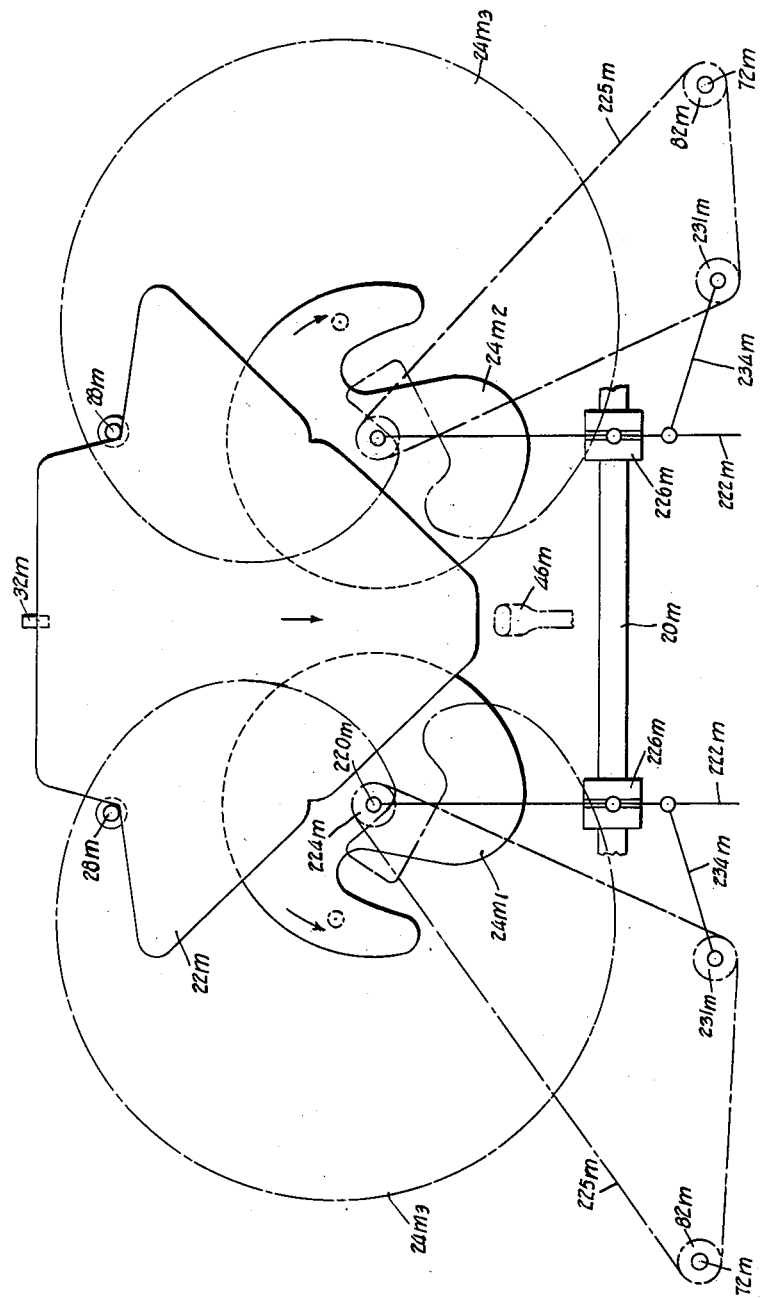
Figure 13 is a diagrammatic plan view showing the disc driving, supporting and adjusting mechanism of Figures 10 and 11 applied to the fan-out feeder of Figures 1 to 6.

The disc supporting, adjusting and driving mechanism of Figures 10 and 11 is equally applicable to the fan-out machine of Figures 1 to 6, as diagrammatically illustrated in Figure 13. Here the drive is from a bodily fixed sprocket 219m through a chain 225m to a sprocket 231m which is connected to drive the separator disc 24m1 and is adjusted in unison with the disc. The chain 225m also runs upon an adjustable chain tightening sprocket 231m which is carried by an adjustable arm 234m. The arm 234m is secured at one end to a slotted arm 222m with capacity for angular and bodily adjustment relative thereto as described in connection with Figures 10 and 11. The arm 222m which carries the shaft 220m of the disc 24m1 is adjustable in the direction of its length with reference to a supporting block 226m, and the block itself is laterally adjustable along a stationary transverse supporting bar 218m, all as described and explained in connection with Figures 10 and 11. The sucker 46m, the supporting roller 32m, and the supporting rods 28m correspond in structure and function respectively to the sucker 46, the supporting roller 32 and the supporting rods 28 of Figure 1. The structure described at the left hand side of Figure 13 is duplicated at the right hand side. The mechanism is shown set up for operating upon a large open side envelope blank 22m, the comparatively small discs 24m1 and 24m2 being shown in their proper positions. The corresponding discs 24m3 required to be used for the same envelope blank in the prior art machine are shown in their proper position in dot and dash lines at 24m3.

The machine of Figures 14 to 18 is a fan-out feeder generally like the feeder shown in Figures 1 to 6. Corresponding reference characters have accordingly been applied to corresponding parts with the subscript "n" added in each instance, and the detailed description will be confined to the features which characterize Figures 14 to 18 and to structure immediately connected therewith.

In this form of machine novel mechanism is provided at the rear of the stack for carrying the principal weight of the stack at the rear end, and novel mechanism is provided at the front of the stack for effecting separation of the blanks.

At the front of the stack each separator disc shafts 124n carry each an upper disc 24n and a lower disc 24p. The sucker 44n has upper and lower suction branches 44an and 44p. With this form of separating mechanism each blank is separated and detached from the stack 22n in two steps.

When the machine is first started the lowermost blank is confined between the four posts 28n and is supported at its rear on extensions 28an of the two rear posts. It is also supported upon the upper discs 24n. At the usual time in the cycle the sucker 44n moves in and then down, causing the sucker branch 44an to seize the margin of the first blank and carry it down below the tips of the upper discs 24n. As the rotation of the discs continues the tips or points of the upper discs enter the space between the stack and the deflected blank and slice through between the blank and the stack. This causes the first blank to be detached from the stack except at the point where it rests on the ledges 28an. The first separating cycle leaves the first blank in the position marked 22n with its body extending slightly downward into the space between the upper and lower discs.

During the second separating cycle the upper sucker branch 44an moves in to engage the second blank so that the second blank will be dealt within the second cycle as the first blank was dealt within the first cycle. At the same time, the lower sucker branch 44p moves in to seize the margin of the first blank and draw it further downward. The pressers 46n also move in and, after the lower disc 24p has acted upon the first blank in the normal manner, press the blank down against the conveyor 48n in position for the roller 49n to be moved over it in the usual way. At each ensuing cycle, two blanks are simultaneously acted upon, one by the upper disc 24n and the upper sucker branch 44an and the other by the lower disc 24p, the lower sucker branch 44p, the presser 46n and the roller 49n. One blank is detached and fed forward at each cycle after the first.

The discs 24n and 24p are of generally similar shape and construction and are mounted to have their tips travel in unison and in corresponding phase. The trailing end of the upper disc 24n differs from the corresponding portion of the disc 24p. The trailing end of 24n is provided with a downwardly inclined plate 250 which constitutes a deflecting lip for displacing the partially separated blank downward into the field of action of the lower sucker branch 44p. In the corresponding area the lower disc 24p may be cut away along the line 253.

The mechanism for taking the weight of the stack off the ledges 28an comprises a stationary bracket 254, in ears 256 and 258 of which a drive shaft 260 is mounted. The shaft 260 is driven from a cam shaft 262 through a sprocket 264, a chain 266 and a sprocket 268. As shown, the shaft 260 is driven in unison with the cam shaft and therefore, like each disc shaft 124n, makes one revolution for each separating cycle of the machine.

The shaft 260 has fast upon it a double threaded worm 270 which drives a worm wheel 272, the worm wheel 272 being keyed to a shaft 274. The shaft 274 is mounted in upper and lower arms 276 and 278 of the bracket 254.

A headed pivot bolt 280 extends parallel to the shaft 274 and provides a pivotal bearing for a lower shovel 282 and an upper shovel 284. The lower shovel comprises a blade 286, an arm 288 upon which the blade is rigidly secured, and a hub 290, also rigid with the arm 288. The upper shovel comprises a blade 292, an arm 294 upon which the blade is rigidly secured, and a hub 296 also rigid with the arm 294. The bolt 280 is successively passed downward through arm 294, hub 296, arm 288, hub 290 and bracket arm 278. A nut 298 is screwed onto the reduced lower threaded end of the bolt 280 to hold the parts operatively assembled.

The shovels 282 and 284 are operated from the worm wheel 272 and the shaft 274, through operating slide links 300 and 302. Each link is pivotally connected to the associated shovel arm and is formed with a straight guide slot 304, through which the shaft 274 passes. As has been noted, the worm gear 272 is keyed to the shaft 274, the connection being effected through a hub portion of the worm gear. A cam 306, keyed to the shaft 274, has its hub disposed to rest upon the gear 272. The slide link 300 rests upon the upper surface of the cam 306. A further cam 308, keyed to the shaft 274, has its hub disposed to rest upon the slide link 300. The slide link 302 rests upon the upper surface of the cam 308. A filler washer or sleeve 310 surrounds the shaft 274 immediately above the slide 302.

The lower shovel 282 is constantly urged outward by a tension coil spring 312 which is connected at one of its ends to the arm 288 and at its opposite end to a stationary part of the machine. The upper shovel 284 is constantly urged outward by a tension coil spring 314 which is connected at one of its ends to the arm 294 and at its opposite end to a stationary part of the machine. The slide link 300 carries a cam follower roller 316 which cooperates with the cam 306, and the slide link 302 carries a cam follower roller 318 which cooperates with the cam 308.

The cams 306 and 308 are of like construction but, as shown, they are displaced in phase relative to the shaft 274 by 180°. Each cam has a lower portion which permits the associated shovel to be pulled back and held clear of the stack for a minor part of the cam rotation and a high portion which compels the associated shovel to be projected forward and maintained in the stack during the major part of the cam rotation. In Figure 15, two kinds of blanks 22n and 22p are illustrated which differ from one another only by the fact that the blanks 22p have longer sealing flaps than the blanks 22n. The blanks 22n are shown in full lines as actually present in the machine, while the blanks 22p are shown in broken lines as they would appear if substituted in the machine for the blanks 22n. When the blanks 22n are operated upon each shovel is clear of the stack for a considerable period, perhaps 90° of travel of the shaft 274, but when the blanks 22p are operated upon, each shovel is clear of the stack for a much shorter period, say 30° of rotation of the shaft 274.

The machine would ordinarily be started from scratch with the upper shovel projected into the stack and the lower shovel withdrawn. It will be assumed, as previously indicated, that there is space for twelve or more blanks between the ledges 28an and the lower shovel blade 286 and for twenty-four blanks between the lower shovel blade 286 and the upper shovel blade 292. It will also be assumed that the gearing is such that the shaft 274 makes one complete revolution for each twelve separating cycles. The operator would take care to insert more than twelve but not substantially more than thirty blanks beneath the upper shovel blade 292, and the remainder of the stack above the upper shovel blade, before setting the machine into operation. By making sure that there are at least a dozen blanks below the upper shovel, the operator assures that there will be no deficiency of available blanks on the ledges 28an during the first revolution of the shaft 274. By limiting the number to not more than 30, the operator assures that there will be sufficient free space between the lower group of blanks and the upper shovel blade at the moment when the lower shovel is thrust into the stack, to avoid the development of positive resistance to upward displacement of the blanks which lie above the lower shovel blade but below the upper shovel blade as the lower blade is thrust into the stack.

After the first revolution of the shaft 274 there will always be 24 blanks between the lower and upper shovel blades as the upper shovel blade enters the stack. By the time that the lower shovel blade is next withdrawn from the stack there will be from one to three blanks left below the lower blade. Withdrawal of the lower blade causes the group of blanks above the lower blade but below the upper blade to drop down, leaving a gap of 9 to 11 blanks' thicknesses plus the thickness of the lower blade immediately below the upper blade. By the time that the lower blade has next entered the stack, one to three more blanks will have been detached. There will then be twelve blanks below the lower blade and a gap equal to twelve blank thicknesses immediately below the upper blade. Withdrawal of the upper blade causes this gap to be filled. It will be seen that each time the lower blade is withdrawn, twelve blanks move downward past it before it reenters the stack, and each time the upper blade is withdrawn, twelve blanks move downward past it before it reenters the stack.

The figures given above are, of course, merely illustrative. A single rotation of the shaft 274 may be made through appropriate gearing to correspond to more or less than twelve revolutions of the cam shaft 262, in which case the number of blanks that pass a shovel blade at each withdrawal will be correspondingly increased or diminished. It is not essential that the lower blade 286 be exactly twelve blank thicknesses above the ledges 28an. There must be at least as many blank thicknesses above the ledges 28an and below the blade 286 as the number of blanks separated during one complete revolution of the shaft 274. The upper blade 292 must also be at least as many blanks thicknesses above the lower blade 286 as the number of blanks separated during one complete revolution of the shaft 274. If these minimum requirements are met for the thickest blanks the machine will function satisfactorily for thinner blanks.

The advantage of the stack supporting shovels will be most advantageously realized if the spacing upward of the lower blade 286 from the ledges 28an does not greatly exceed the minimum requirement for the thickest blanks, since that will insure the minimum of weight on the blanks actually undergoing separation. The same consideration does not apply to the same extent to the spacing between the lower and upper shovel blades 286 and 292, and there is an advantage at starting in causing that spacing substantially to exceed the minimum as indicated in the illustrative description given above.

I have described what I believe to be the best embodiments of my invention. I do not wish, however, to be confined to the embodiments shown, but what I desire to cover by Letters Patent is set forth in the appended claims.

I claim:

1. In a blank feeding mechanism for envelope machines, in combination, means for deflecting a marginal portion of the bottommost blank of a stack for separating action, and blank supporting and separating means comprising a shaft for supporting and driving a separator disc, a supporting bearing for the shaft, means supporting the bearing with capacity for bodily adjustment in any desired direction at right angles to its own axis, a bodily immovable drive shaft, and transmission mechanism coordinately adjustable to maintain an operative driving relationship between the immovable drive shaft and the disc supporting shaft in any desired position of adjustment of the latter.

2. In a blank feeding mechanism for envelope machines, in combination, means for deflecting a marginal portion of the bottommost blank of a stack for separating action, and blank supporting and separating means comprising a shaft for supporting and driving a separator disc, a supporting bearing for the shaft, a bodily fixed driving shaft, a supporting unit for the bearing comprising a primary support mounted for rotative adjustment about the axis of the driving shaft, and a secondary support mounted on the primary support for longitudinal adjustment relative thereto, and transmission mechanism carried jointly by the supports and by the driving shaft for providing a driving connection between said shafts throughout a wide range of adjustments of the supports.

3. In a blank feeding mechanism for envelope machines, in combination, a separator disc, a supporting and driving shaft for the disc, and supporting and driving mechanism for the shaft comprising, a bodily fixed driving shaft, a driving sprocket on the shaft, a bracket mounted coaxially with the fixed shaft and with capacity for rotative adjustment, a bar mounted on the bracket with capacity for longitudinal adjustment, a bearing for the disc supporting shaft carried rigidly at one end of the bar, an end sprocket secured on an end of the disc supporting shaft, a second end sprocket supported on the bar at the end remote from the first end sprocket and at a fixed distance therefrom, a chain trained on the driving sprocket and on the end sprockets, and a pair of guide sprockets mounted on the bracket at fixed distances from the driving sprockets, said guide sprockets engaging the outer side of the chain in positions to maintain the chain stretch engaged by them parallel with a chain stretch which runs directly from one to the other of the end sprockets, and to guide a portion of the chain between them to and from the drive sprocket, the bracket and bar with their supported sprockets being rotatable as a unit about the axis of the fixed shaft, and the bar with its supported sprockets being longitudinally adjustable as a unit relative to the bracket.

4. In a blank feeding mechanism for envelope machines, in combination, means for deflecting a marginal portion of the bottommost blank of a stack for separating action, and blank supporting and separating means comprising a shaft for supporting and driving a separator disc, a supporting bearing for the shaft, means supporting the bearing with capacity for bodily adjustment in any desired direction at right angles to its own axis, a bodily immovable drive shaft, transmission mechanism responsive to adjustment of the character referred to for maintaining a fully effective driving connection between the bodily immovable drive shaft and the disc supporting shaft, and means for fixing the bearing in any desired position of adjustment.

5. In a blank feeding mechanism for envelope machines, in combination, means for deflecting a marginal portion of the bottommost blank of a stack for separating action, and blank supporting and separating means comprising a shaft for supporting and driving a separator disc, a supporting bearing for the shaft, means supporting the bearing with capacity for bodily adjustment in any desired direction at right angles to its own axis, a bodily immovable drive shaft, transmission mechanism responsive to adjustment of the character referred to for maintaining a fully effective driving connection between the immovable drive shaft and the disc supporting shaft, a linkage forming an adjustable connection between the bearing and the machine frame, capable of accommodation to the bearing adjustment, and means for securing the linkage against adjustment to retain the bearing definitely in any selected position of adjustment.

6. In a blank feeding mechanism for envelope machines, in combination, means for deflecting a marginal portion of the bottommost blank of a stack for separating action, and blank supporting and separating means comprising a pair of shafts each for supporting and driving a separator disc, a supporting bearing for each shaft, means supporting each bearing with capacity for bodily adjustment in any desired direction at right angles to its own axis and independently of the other bearing, a bodily immovable drive shaft for each disc supporting shaft, and transmission mechanism adjustable to maintain operative driving connection between the responsive immovable and disc supporting shafts in any selected position of adjustment of the latter.

7. In a blank feeding mechanism for envelope machines, in combination, means for deflecting a marginal portion of the bottommost blank of a stack for separating action, and blank supporting and separating means comprising a pair of shafts each for supporting and driving a separator disc, a supporting bearing for each shaft, means supporting each bearing with capacity for bodily adjustment in any desired direction at right angles to its own axis and independently of the other bearing, a bodily immovable drive shaft for each disc supporting shaft, transmission mechanism responsive to adjustment of the character referred to for maintaining a fully effective driving connection between the responsive immovable and disc supporting shafts, and means for fixing the bearings in desired positions of adjustment.

8. In a blank feeding mechanism for envelope machines, in combination, a separator disc, a supporting and driving shaft for the disc, and supporting and driving mechanism for the shaft comprising a bodily fixed driving shaft, a driving sprocket on the fixed shaft, a bracket mounted coaxially with the fixed shaft and with capacity for rotative adjustment, a bar mounted on the bracket with capacity for longitudinal adjustment, a bearing for the disc supporting shaft carried rigidly at one end of the bar, an end sprocket secured on one end of the disc supporting shaft, a second end sprocket supported on the bar at the end remote from the first end sprocket and at a fixed distance therefrom, a chain trained on the driving sprocket and on the end sprockets, and a pair of guide sprockets mounted on the bracket at fixed distances from the driving sprocket, said guide sprockets engaging the outer side of the chain in positions to maintain the chain stretch engaged by them parallel with a chain stretch which runs directly from one to the other of the end sprockets, and to guide a portion of the chain between them to and from the drive sprocket, the bracket and bar with their supported sprockets being rotatable as a unit about the axis of the fixed shaft, and the bar with its supported sprockets being longitudinally adjustable as a unit relative to the bracket, and means for conveniently breaking and reestablishing the driving relation of the bodily immovable shaft to the sprocket carried by it for enabling phase disturbance of the separator disc resulting from adjustment to be conveniently corrected or avoided.

9. In a blank feeding mechanism for envelope machines, in combination, means for deflecting a marginal portion of the bottommost blank of a stack for separating action, and blank supporting and separating means comprising a pair of shafts each for supporting a driving separator disc, a supporting bearing for each shaft, means supporting each bearing with capacity for bodily adjustment in any desired direction at right angles to its own axis and independently of the other bearing, a bodily immovable drive shaft for each disc supporting shaft, and transmission mechanism responsive to adjustments of the character referred to for maintaining a fully effective driving connection between the respective immovable and disc supporting shafts, and separator discs on the respective disc driving shafts, the disc being of unequal diameters.

10. In a fan-out feeder for envelope blanks, in combination, means for supporting a stack of blanks in a generally upright attitude including a pair of blank separating discs, a sucker engageable with a forward central portion of the lowermost blank to deflect such portion downward for the separating action of the disc tips, a pair of disc carrying shafts, means supporting the shafts with capacity for independent universal adjustment at right angles to their axes, adjustable driving connections to said shafts, and adjustable means for fixing the shafts in various positions of adjustment at equal or unequal distances from the central feed line and upon the same or different transverse lines, to enable discs of equal or unequal sizes to be utilized which are the smallest consistent with the provision of adequate stack support.

11. In a fan-out feeder for envelope blanks, in combination, means for supporting a stack of blanks in a generally upright attitude including a pair of blank separating discs, a sucker engageable with a forward central portion of the lowermost blank to deflect such portion downward for the separating action of the disc tips, a pair of disc carrying shafts, means supporting the shafts with capacity for independent universal adjustment at right angles to their axes, adjustable driving connections to said shafts, and adjustable means for fixing the shafts in various positions of adjustment at equal or unequal distances from the central feed line and upon the same or different transverse lines, to enable discs of equal or unequal sizes to be utilized which are the smallest consistent with the provision of adequate stack support, the stack supporting means including, at the side of the stack remote from the discs, only very narrow marginal supports which oppose no substantial resistance to blank feeding and which permit the trailing portion of a blank to fall freely as it starts to advance.

12. In a blank feeding mechanism for envelope machines, in combination, means for deflecting a marginal portion of the bottommost blank of a stack for separating action, and blank supporting and separating means comprising a shaft for supporting and driving a separator disc, a supporting bearing for the shaft, means supporting the bearing for movement in any desired direction at right angles to its own axis, means for fixing the bearing in various desired positions of adjustment, a bodily fixed drive shaft, a driving connection between said shafts comprising sprockets fixed on the respective shafts and a chain trained on the sprockets, an idler engaged with the chain, and means for flexibly supporting the idler sprocket.

13. In a blank feeding mechanism for envelope machines, in combination, a shaft for supporting and driving a separator disc, a bearing for the shaft, a supporting member unitary with said bearing, a first support for said supporting member upon which the supporting member is mounted with capacity for rectilinear adjustment at right angles to the direction of the bearing axis, means for securing the supporting member in fixed relation to said first support when desired, a second support upon which the first support is mounted with capacity for rectilinear adjustment at right angles to the direction of the bearing axis and at right angles to the direction of adjusting movement of the supporting member relative to the first support, means for securing the first support in fixed relation to the second support when desired, a bodily fixed drive shaft, a driving connection between said shafts comprising sprockets fixed on the respective shafts and a chain trained on the sprockets, an idler sprocket engaged with the chain, and means for adjustably supporting the idler sprocket.

14. A pull-out feeder for envelope blanks comprising, in combination, stack supporting rods inclined slightly downward, separator discs engageable with upper portions of the blank at the lower end of the stack, a sucker operable on the end blank to deflect an upper marginal portion for the separating action of the discs, supporting shafts for the respective discs, bearings for the respective shafts, means for supporting the bearings for movements independently of one another in any desired direction at right angles to their own axes, means for fixing the bearings in various desired positions of adjustment, bodily fixed drive shafts for the respective disc shafts, and transmission mechanisms coordinately adjustable to maintain operative driving relationship between the respective fixed and disc shafts in any desired positions of adjustment of the latter shafts.

15. A blank supplying mechanism for envelope machines comprising, in combination, a suction member for deflecting a marginal portion of a blank at the lower end of a stack, a pair of rotary stack supporting discs disposed to support the forward portion of the stack, each disc having a tip portion for slicing through between the deflected blank and the remainder of the stack, to partially separate the bottom blank, driving and supporting shafts for the discs, a second, lower disc on each shaft, means supporting the stack at the rear, a second suction member operable in unison with the first but located at a lower level than the first for engaging the tip of the partially separated blank and pulling it further downward into the field of action of the second disc, a presser, means moving the presser over said blank and downward for still further depressing the forward end of the blank, and feeding means for seizing the depressed blank and feeding it forward to detach it at the rear from the stack.

16. A blank supplying mechanism for envelope machines as set forth in claim 15, in which the upper and lower discs on each shaft are disposed with their tips in corresponding phase and in which the trailing portion of each upper disc is provided with a downwardly displaced depressing lip.

17. A blank supplying mechanism for envelope machines as set forth in claim 15, in which the upper and lower discs on each shaft are disposed with their tips in corresponding phase and in which the trailing portion of each upper disc is provided with a downwardly displaced depressing lip, and the trailing portion of each lower disc is cut away in a portion of the area directly beneath the margin of the depressing lip of the associated upper disc.

18. A blank supplying mechanism as set forth in claim 15 in which the means for supporting the stack at the rear comprises stationary ledge members, a pair of shovels located at different levels above said ledges and insertable into the stack from the rear, and operating means for the shovels constructed and arranged to cause one shovel and then the other to be withdrawn briefly from the stack and then reinserted in it, each shovel when inserted being caused to remain inserted throughout a multiplicity of cycles of the operating discs.

19. A blank supplying mechanism for envelope machines comprising, in combination, a suction member for deflecting a marginal portion of a blank at the lower end of a stack, a pair of rotary discs on a common shaft, the first disposed to support a forward portion of the stack and the second located beneath the first, each disc having a tip portion for slicing through between the deflected blank and the remainder of the stack, to partially separate the bottom blank, driving and supporting shafts for the discs, means supporting the stack at the rear, a second suction member operable in unison with the first but located at a lower level than the first for engaging the tip of the partially separated blank and pulling it further downward into the field of action of the second disc, a presser, means moving the presser over said blank and downward for still further depressing the forward end of the blank, and feeding means for seizing the depressed blank and feeding it forward to detach it at the rear from the stack.

20. A blank supplying mechanism for envelope machines comprising, in combination, a pair of rotary discs for supporting the forward portion of a blank stack, stationary supporting members engageable with the bottom of the stack at the rear marginal portion thereof, a sucker for deflecting a forward tip portion of the lowermost blank away from the stack, the discs having tip portions adapted to slice through between the deflected blank portion and the next overlying blank of the stack, feeding means for detaching the blanks singly from the stack, one for each disc cycle, and means for taking the major weight of the stack off of said discs and said stationary supporting means comprising a plurality of thin, flat shovels located at different levels above the stationary supporting means and insertable into the stack from the rear, and operating means for the shovels constructed and arranged to cause one shovel and then the other to be withdrawn briefly from the stack and then reinserted deeply into the stack in a direction parallel to the plane defined by the rotary discs and the stationary supporting means, the direction of such insertion coinciding with the body plane of the shovel.

21. A blank supplying mechanism for envelope machines comprising, in combination, a pair of rotary discs for supporting the forward portion of a blank stack, stationary supporting members engageable with the bottom of the stack at the rear marginal portion thereof, a sucker for deflecting a forward tip portion of the lowermost blank away from the stack, the discs having tip portions adapted to slice through between the deflected blank portion and the next overlying blank of the stack, feeding means for detaching the blanks singly from the stack, one for each disc cycle, and means for taking the major weight of the stack off of said discs and said stationary supporting means comprising a plurality of shovels located at different levels above the stationary supporting means and insertable into the stack from the rear, and operating means for the shovels constructed and arranged to cause one shovel and then the other to be withdrawn briefly from the stack and then reinserted in it, each shovel when inserted being caused to remain inserted throughout a multiplicity of cycles of the separating discs.

22. A blank supplying mechanism for envelope machines comprising, in combination, a pair of rotary discs for supporting the forward portion of a blank stack, stationary supporting members engageable with the bottom of the stack at the rear marginal portion thereof, a sucker for deflecting a forward tip portion of the lowermost blank away from the stack, the discs having tip portions adapted to slice through between the deflected blank portion and the next overlying blank of the stack, feeding means for detaching the blanks singly from the stack, one for each disc cycle, and means for taking the major weight of the stack off of said discs and said stationary supporting means comprising a plurality of hovels located at different levels above the stationary supporting means and insertable into the stack from the rear, and operating means for the shovels constructed and arranged to cause one shovel and then the other to be withdrawn briefly from the stack and then reinserted in it, each shovel being timed to remain inserted throughout a multiplicity of cycles of the separating discs and throughout the period of withdrawal of the other shovel.

23. A blank supplying mechanism for envelope machines comprising, in combination, a pair of rotary discs for supporting the forward portion of a blank stack, stationary supporting members engageable with the bottom of the stack at the rear marginal portion thereof, a sucker for deflecting a forward tip portion of the lowermost blank away from the stack, the discs having tip portions adapted to slice through between the deflected blank portion and the next overlying blank of the stack, feeding means for detaching the blanks singly from the stack, one for each disc cycle, and means for taking the major weight of the stack off of said discs and said stationary supporting means comprising a plurality of shovels located at different levels above the stationary supporting means and insertable into the stack from the rear, and operating means for the shovels constructed and arranged to cause one shovel and then the other to be withdrawn briefly from the stack and then reinserted in it, each shovel being timed to remain inserted throughout a multiplicty of cycles of the separating discs and throughout the period of withdrawal of the other shovel, the lower shovel being spaced above the stationary supporting means far enough to assure that there will be at least as many blank thicknesses below the lower shovel and above the stationary supporting means as there are disc cycles in a single shovel cycle, and the other shovel being spaced above the lower shovel by at least an equal distance.

24. A blank supplying mechanism for envelope machines comprising, in combination, a pair of rotary discs for supporting the forward portion of a blank stack, stationary supporting members engageable with the bottom of the stack at the rear marginal portion thereof, a sucker for deflecting a forward tip portion of the lowermost blank away from the stack, the discs having tip portions adapted to slice through between the deflected blank portion and the next overlying blank of the stack, feeding means for detaching the blanks singly from the stack, one for each disc cycle, and means for taking the major weight of the stack off of said discs and said stationary supporting means comprising a plurality of shovels located at different levels above the stationary supporting means and insertable into the stack from the rear, and operating means for the shovels constructed and arranged to cause one shovel and then the other to be withdrawn briefly from the stack and then reinserted in it, each shovel being timed to remain inserted throughout a multiplicity of cycles of the separating discs and throughout the period of withdrawal of the other shovel, the lower shovel being spaced above the stationary supporting means far enough to assure that there will be at least as many blank thicknesses below the lower shovel and above the stationary supporting means as there are disc cycles in a single shovel cycle, and the other shovel being spaced above the lower shovel by a substantially greater distance.

25. A blank supplying mechanism for envelope machines comprising, in combination, a pair of rotary discs for supporting the forward portion of a blank stack, stationary supporting members engageable with the bottom of the stack at the rear marginal portion thereof, a sucker for deflecting a forward tip portion of the lowermost blank away from the stack, the discs having tip portions adapted to slice through between the deflected blank portion and the next overlying blank of the stack, feeding means for detaching the blanks singly from the stack, one for each disc cycle, means providing independent universal adjustment of each of said discs with its driving shaft, and means for taking the major weight of the stack off said discs and said stationary supporting means comprising a plurality of shovels located at different levels above the stationary supporting means and insertable into the stack from the rear, and operating means for the shovels constructed and arranged to cause one shovel and then the other to be withdrawn briefly from the stack and then reinserted in it.

26. A blank supplying mechanism for envelope machines comprising, in combination, a pair of rotary discs for supporting the forward portion of a blank stack, stationary supporting members engageable with the bottom of the stack at the rear marginal portion thereof, a sucker for deflecting a forward tip portion of the lowermost blank away from the stack, the discs having tip portions adapted to slice through between the deflected blank portion and the next overlying blank of the stack, feeding means for detaching the blanks singly from the stack, off of said discs and said stationary supporting means comprising a plurality of thin, flat shovels located at different levels above the stationary supporting means and insertable into the stack from the rear, and operating means for the shovels constructed and arranged to cause one shovel and then the other to be withdrawn briefly from the stack and then reinserted deeply into the stack in a direction parallel to the plane defined by the rotary discs and the stationary supporting means, the direction of such insertion coinciding with the body plane of the shovel.

27. An apparatus adapted to separate the lowermost envelope blank from the envelope blank stack in an envelope making machine which apparatus comprises a plurality of arms, separating discs mounted on each of said arms, means for slidable and pivotable adjustment of said arms in a plane approximately parallel to the lowermost envelope blank in the stack, whereby adjustment for various size blanks may be made without changing discs and driving means to rotate said discs whereby said discs separate the lowermost envelope from the stack of envelopes, one at a time.

References Cited in the file of this patent
UNITED STATES PATENTS

| | | |
|---|---|---|
| 1,204,188 | Pye | Nov. 7, 1916 |
| 1,804,612 | Halvorsen | May 12, 1931 |
| 1,808,706 | Novick | June 2, 1931 |